United States Patent [19]

Swenson

[11] 4,103,858

[45] Aug. 1, 1978

[54] SEAT SUPPORT ASSEMBLY FOR A RECREATIONAL VEHICLE

[75] Inventor: Richard F. Swenson, Milwaukee, Wis.

[73] Assignee: Milsco Manufacturing Company, Brown Deer, Wis.

[21] Appl. No.: 817,574

[22] Filed: Jul. 21, 1977

[51] Int. Cl.$^2$ .............................................. A45D 19/04
[52] U.S. Cl. ................... 248/399; 248/421; 267/132
[58] Field of Search ............................... 248/372–385, 248/387–392, 399, 400, 421, 423; 267/91, 131, 132, 142, 167, 169; 297/195, 203, 209, 243, DIG. 9

[56] References Cited

U.S. PATENT DOCUMENTS

| | | | |
|---|---|---|---|
| 1,355,225 | 10/1920 | Gynn | 248/399 X |
| 2,452,280 | 10/1948 | Zahller | 248/399 UX |
| 2,531,572 | 11/1950 | Knoedler | 248/400 X |
| 2,680,472 | 6/1954 | Hempe | 267/132 X |
| 2,852,258 | 9/1958 | Dunklee et al. | 248/399 UX |
| 3,006,593 | 10/1961 | Plate et al. | 248/399 UX |
| 3,319,920 | 5/1967 | Freedman et al. | 248/399 |

FOREIGN PATENT DOCUMENTS

| | | | |
|---|---|---|---|
| 561,877 | 4/1923 | France | 297/209 |
| 624,171 | 3/1927 | France | 248/378 |
| 199,714 | 12/1923 | United Kingdom | 297/209 |
| 508,279 | 6/1939 | United Kingdom | 297/209 |

*Primary Examiner*—Lawrence J. Staab
*Attorney, Agent, or Firm*—James E. Nilles

[57] ABSTRACT

A seat supporting assembly for use in recreational vehicles such as motorcycles or the like and which includes pivotable arms between the vehicle frame and the seat for supporting the seat for generally linear vertical movement and further includes a spring assembly resiliently supporting the seat. The spring assembly can be pivoted to a different inclined position to adjust the resilient effect of the spring assembly and thereby compensate for riders of different weights. A generally flat, telescoping strut is utilized for preventing relative rotation between supporting shafts, which shafts have seat supporting springs located between them. The strut also prevents the springs from buckling by preventing such rotation of their shafts. The generally flat, telescoping strut, which also serves as an upper stop means for the seat, eliminates the necessity for a conventional spring strut and permits the load to be all imposed on rearwardly located spring means.

5 Claims, 8 Drawing Figures

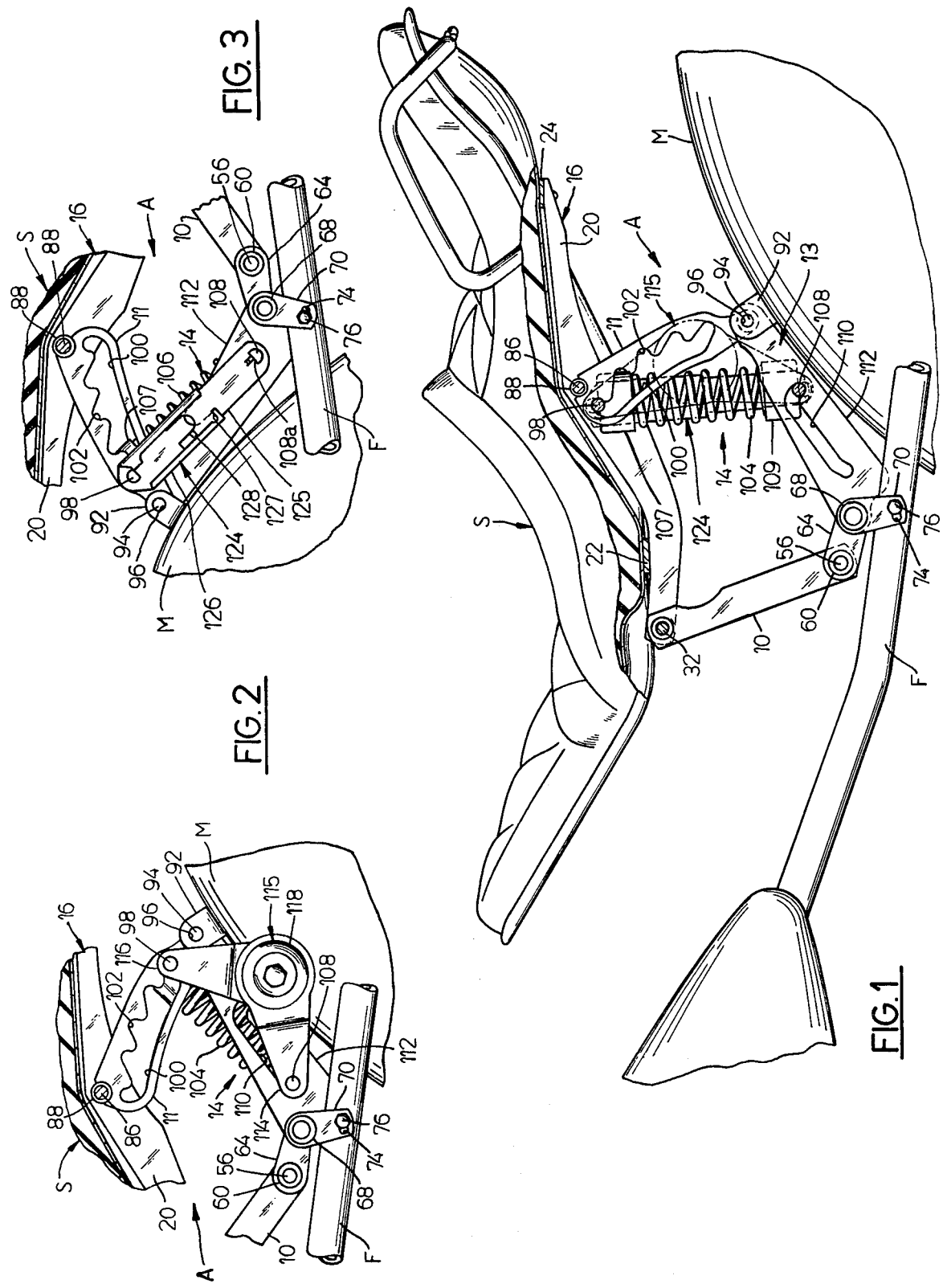

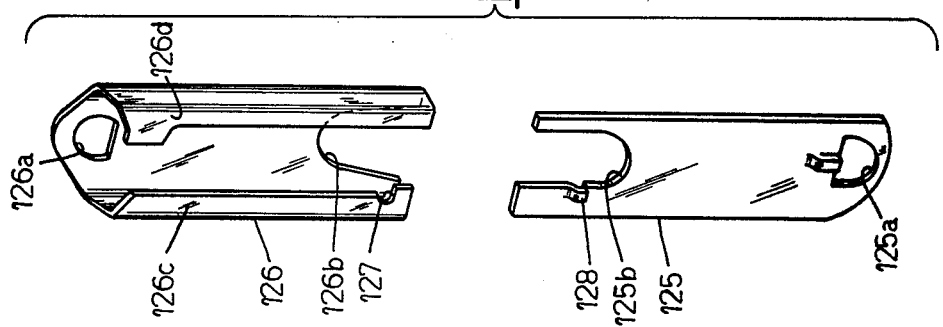
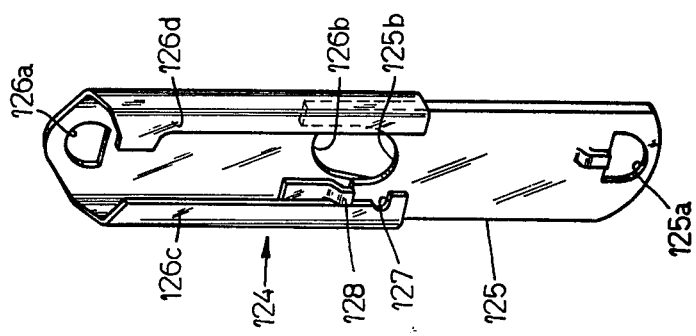
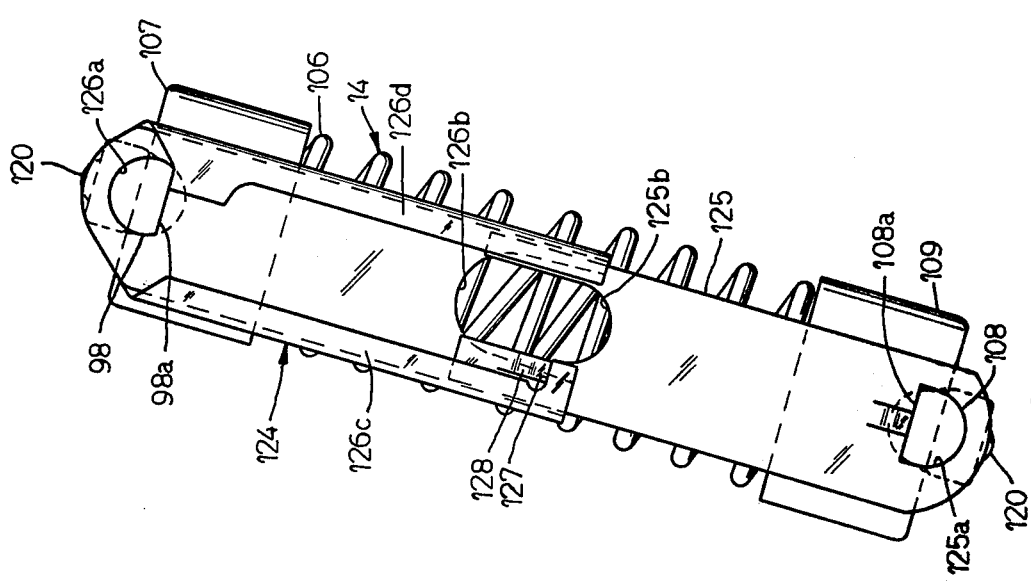
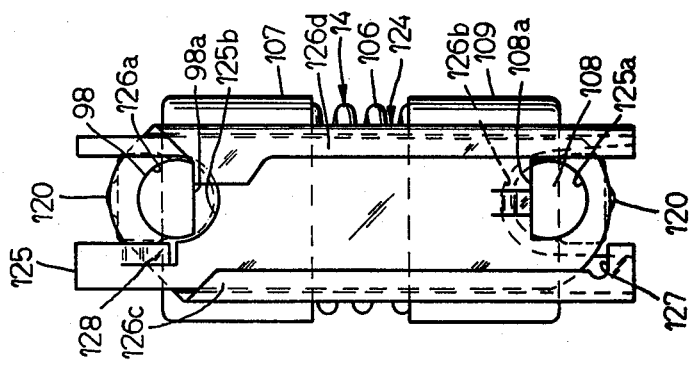

SEAT SUPPORT ASSEMBLY FOR A RECREATIONAL VEHICLE

BACKGROUND OF THE INVENTION

The present invention pertains to seat supporting assemblies which provide resilient support for seats used in recreational vehicles, motorcycles, and the like.

Some prior art vehicles have provided resilient means for supporting the seat by mounting the seat on the rearward end of a cantilevered, generally horizontally extending bracket, and the forward end of the bracket is pivotally mounted to the vehicle frame and the bracket is supported intermediate its length by a vertically extending coil spring assembly which serves to provide resilient support for the seat; in that arrangement, however, since the seat is pivotable about a pivot point located in front of the seat, during vertical oscillation of the seat, the rear portion of the seat will have greater vertical movement than the forward part of the seat. This drawback is accentuated in the event that the seat is sufficiently long to comfortably support two riders. If the seat is supported such that the forward portion of the seat has a sufficient vertical movement to provide a comfortable ride for the driver, the rear portion will have an undesirable amplitude of movement.

In still other prior devices, there is no convenient means to effectively adjust the resiliency of the springs supporting the seat. Some prior seats provide auxiliary supporting devices which can be added to support the seat but these devices are not adjustable to compensate for any variations in the weight of riders and passengers, and they are usually not conveniently added or removed.

The present invention is in the nature of an improvement over my U.S. Pat. No. 4,029,284 which issued June 14, 1977 and entitled "Seat Support Assembly for Recreational Vehicle", which patent has been assigned to an assignee common with the present application. In that patent, a forwardly located spring loaded cylindrical strut was used between the forward end of the seat and the vehicle frame and this strut was of considerable size in that it was used to carry some of the weight imposed on the vehicle seat. The present invention eliminates the need of this cylindrical spring strut so as to enhance the compactness of the seating arrangement, reduce the cost and furthermore results in an unobstructed area adjacent the front end of the seat.

SUMMARY OF THE INVENTION

The seat supporting assembly of the invention includes a seat support structure facilitating substantially uniform vertical movement of the forward and rearward portions of the seat and providing adjustable resilient seat supporting means which provide convenient adjustment for riders of different weights or the addition of a second rider. The assembly generally comprises a plurality of substantially parallel pivotable arms positioned beneath the seat and pivotable about pivot points located beneath the seat thereby supporting the seat for substantially uniform vertical movement. The seat supporting assembly also includes a spring assembly for resiliently supporting the seat and being pivotably supported at its lower end such that it can be moved to any of a plurality of positions varying from a vertical position to a substantially rearwardly inclined position. In the vertical position, the spring assembly will provide firm but resilient support for the seat whereas, when the spring assembly is in a substantially inclined position, the spring will have less mechanical advantage and will provide a softer ride.

More specifically, the present invention provides a seat supporting assembly of the above type in which the conventional forward spring strut for supporting the forward end of the seat has been eliminated and instead the weight imposed on the seat is absorbed by the rearwardly located main spring means. The invention includes a generally flat, telescoping strut which is connected between two parallel, horizontal shafts to which the main spring means are attached; the flat, telescoping strut has a connection with the ends of the shafts which prevents relative rotation between the shafts and consequently prevents buckling of the springs which would otherwise occur due to the heavy load imposed on them. The flat, telescoping strut furthermore acts as an up-stop for the seats. The heavy springs have their opposite ends set in oppositely facing cups which in turn are rigidly secured to their respective shafts, thus providing a good mounting for the springs which together with the generally flat, telescoping strut prevents buckling of the springs and at the same time provides an easily assembled and disassembled unit, eliminating the need for rivetting, bolting, or otherwise securing the springs in their mountings.

The assembly provided by the present invention is supported so that the front and rear portion of the seat move substantially the same distance and consequently a longer seat, for example, for two riders, is more feasible. In addition, the above mentioned springs, which carry the entire load of the seat, can be adjusted to either provide additional resilient support for a second rider or to compensate for the different weights of riders.

These and other objects and advantages of the present invention will appears hereinafter as this disclosure progresses, reference being had to the accompanying drawings.

BRIEF DESCRIPTION OF THE DRAWINGS

FIG. 1 is a side view of a motorcycle seat supported by a seat supporting assembly of the present invention, certain parts being shown as broken away or in section for clarity in the drawings;

FIG. 2 is a fragmentary view of the structure shown in FIG. 1, but showing the rear spring assembly, supporting the rearward portion of the motorcycle seat, in a more rearwardly inclined position.

FIG. 3 is a view similar to FIG. 2, but showing the flat, telescoping strut in the medium ride position, but the view is taken from the side opposite that shown in FIG. 2;

FIG. 5 is a side elevational view of the generally flat, telescoping strut provided by the present invention and shown in FIG. 3, but showing the strut in the fully collapsed position;

FIG. 6 is a view similar to FIG. 5, but showing the telescoping strut in the fully extended position;

FIG. 7 is a perspective view of the strut shown in the nearly extended position; and FIG. 8 is an exploded perspective view of the strut shown in FIG. 7.

DESCRIPTION OF A PREFERRED EMBODIMENT

Figure 4:
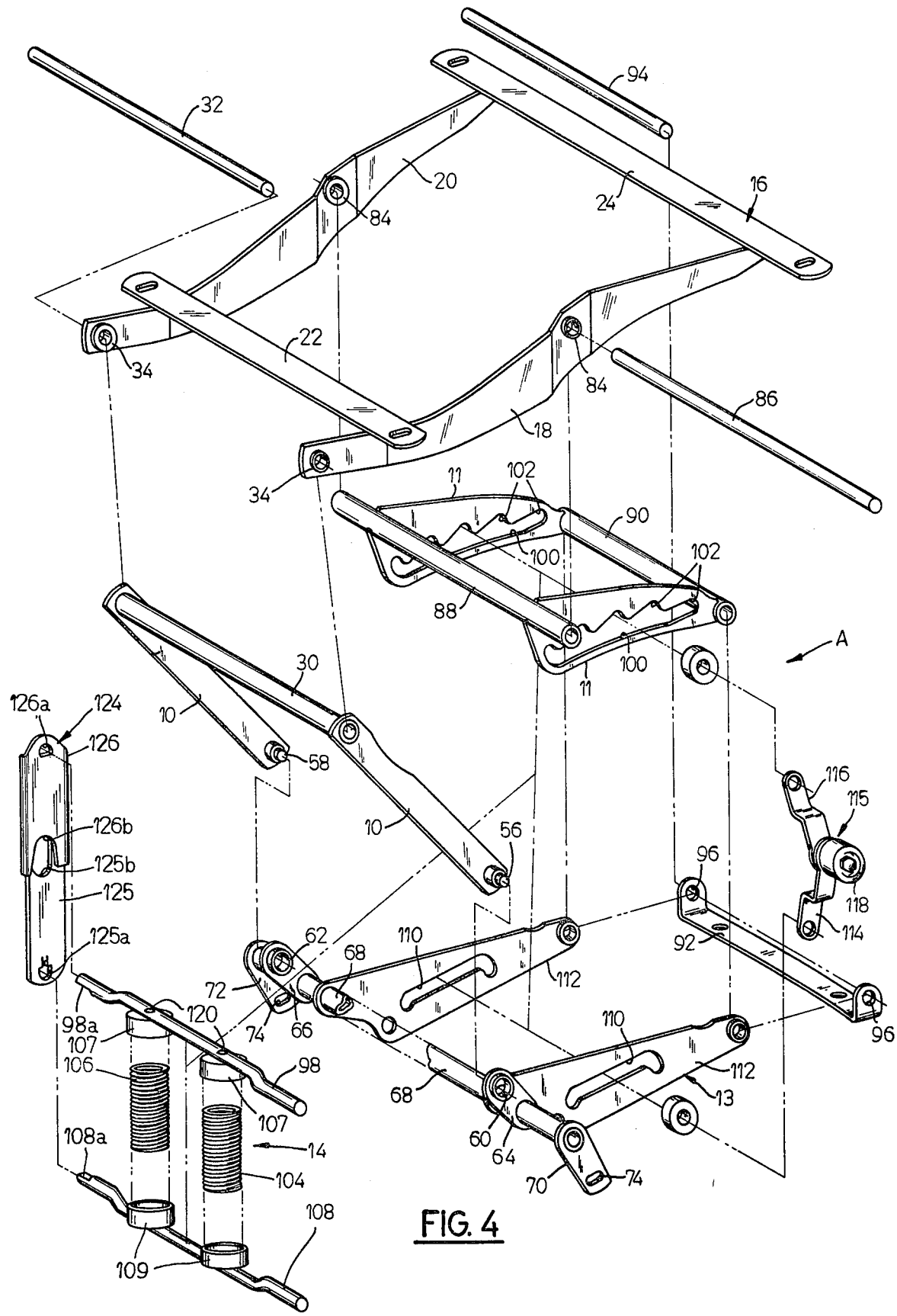
FIG. 4 is an exploded isometric view of some of the structural elements of the seat support assembly of the present invention.

The seat supporting assembly A is generally comprised of a pair of parallel, pivotable arms 10 and 11 extending between the vehicle seat S and a rigid frame assembly 13, secured to the motorcycle M, to provide support for the seat S and to restrict its movement to vertical movement only. The seat supporting assembly further includes a rear spring assembly 14, functioning to provide resilient support for the seat S.

The motorcycle seat S is directly supported by a rigid seat support frame 16 (FIG. 1) comprised of a pair of curved longitudinally extending frame members 18 and 20 and laterally extending front and rear seat supporting bars 22 and 24, respectively, rigidly connected at their opposite ends to the frame members 18 and 20. As shown in FIG. 1, the forward end of the rigid seat support frame 16 is supported by the pair of laterally spaced and forwardly inclined pivotable arms 10. The upper ends of the arms 10 receive opposite ends of a transversely extending tube 30 which is thus rigidly supported by the ends of the arms 10. A shaft 32 is received through the tube 30 and is also received through bushings 34 positioned in the forward ends of the seat supporting frame members 18 and 20.

Pivotable arms 10 are forwardly inclined and are pivotably supported at their lower ends by the frame assembly 13. More specifically, the lower ends of the pivotable arms 10 include pivot pins 56 and 58 received within aligned bushings 60 and 62 supported in the upwardly extending ends of the rigidly supported links 64 and 66. The links 64 and 66 are rigidly attached to and supported by a laterally extending tube 68 which in turn is supported at its opposite ends by supporting links 70 and 72. As shown in FIGS. 1-4, the supporting links 70 and 72 are bolted to the frame F of the motorcycle M. In order to permit proper alignment or adjustment of the position of the tube 68, the supporting links 70 and 72 include slots 74 for receiving bolts 76.

Frame assembly 16 is also supported by the pair of laterally spaced rear pivotable arms 11 and by the spring assembly 14. The pair of rear pivotable arms 11 are connected to the seat supporting frame 16 at a point intermediate its length where the seat supporting frame members 18 and 20 each house bushings 84 which receive opposite ends of a shaft 86. The shaft 86 extends through tube 88 which is rigidly attached at positions adjacent to its ends to the pivotable arms 11. The lower ends of the pivotable arms 11 are each rigidly connected to opposite ends of a laterally extending tube 90 which is in turn pivotably connected to a fender bracket 92 of the frame assembly 13 by means of a shaft 94 which extends through bores 96 at opposite ends of the fender bracket and through the tube 90. Arms 11 each include a longitudinally extending slot 100 therein for receiving opposite ends of a transverse shaft 98 of the rear spring assembly 14. The slots 100 each include a plurality of notches 102 such that the shaft 98 can be releaseably and adjustably positioned at a plurality of positions.

Referring again to the spring assembly 14, it is comprised of generally vertically extending parallel coil springs 104 and 106 which nest in spring cups 107, 109 which are secured to the upper and lower transverse shafts 98 and 108, respectively. The lower transverse shaft 108 is slideably received at its opposite ends in slots 110 disposed in a pair of parallel spaced support brackets 112 of the rigid frame assembly 13. The support brackets 112 each include a bushing in their rearward end whereby they can be rigidly supported by the shaft 94 and the fender bracket 92. The forward end of each of the support brackets 112 is rigidly supported by the tube 68.

A conventional damping assembly 115 (FIGS. 2 and 4) is disposed on one side of the seat supporting assembly and connecting the support bracket 112 and the arms 11 to dampen movement of the pivotal arms 11 and thus restrict vertical oscillation of the seat S. The damping assembly 115 includes a lower pivotable linkage 114 pivotably connected to one end of the lower transverse shaft 108 and is thus slideably supported by the slot 110 of the support bracket 112. The damping assembly 115 further includes an upper pivotable linkage 116 pivotably connected to the shaft 98 of the rear spring assembly 14 and thus supported for movement along slot 100. The pivotable linkages 114 and 116 are mutually joined by a conventional friction damping means 118 of a type which retards relative pivotal movement of the linkages 114 and 116, to thus retard vertical movement of the seat in a variable manner as adjustments are made for different weight riders, to provide a smooth and comfortable ride.

Shaft 98 which joins the upper ends of the coil springs 104 and 106 is movable in the slots 100 to be received in any of the plurality of notches 102 such that the rear spring assembly 14 can be variably position. FIG. 1 illustrates the spring assembly 14 positioned such that the coil springs 104 and 106 are substantially vertical whereby the springs will provide a relatively firm ride and support substantial weight. With the springs in this relative position, the seat supporting assembly can easily compensate for the weight of both a rider and passenger. If, on the other hand, the seat is to support less weight and/or a softer ride is to be provided, the shaft 98 can be moved to a more rearward notch (FIG. 2) such that the springs 104 and 106 will be rearwardly inclined and have less mechanical advantage so as to provide less resilient support for the seat.

More particularly, the spring assembly 14 has its cups 107 and 109 fastened to their respective shafts 98 and 108 by means of rivets, bolts, or the like 120 wherein the cups are rigidly secured to their respective shafts and cannot twist with respect thereto. The springs 104 and 106 are of the heavy duty type and their opposite ends nest in the opposed cups and can be removed or replaced therein when the unit is disassembled without the need for other fastening devices. One end of the shafts 98 and 108 have a flat portion 98a and 108a respectively formed thereon so that the ends of the shaft are non-circular in cross section. A generally flat, steel strut 124 has an inner member 125 and an outer member 126 which telescope together in expanding and contracting directions and the outer ends of the members 125 and 126 have respective non-circular shaped openings 125a and 126a that complement the shape of the ends of the shafts and receive those ends of the shafts. Thus, the shafts 98 and 108 are prevented from rotating and instead are held in a constant attitude relative to one another along with their respective cups. Thus, when the unit is assembled, the springs cannot buckle or twist out of their supporting position. The details of the strut itself are shown in detail in FIGS. 5 to 8; FIG. 5 showing the strut in the fully contracted position, FIG. 6 showing the strut in the extended position, and FIG. 7 showing the strut in the intermediate position, and FIG. 8 showing the strut in the disassembled position.

It will be noted that the inner ends of the strut portions 125 and 126 also have open ended slots 125b and 126b respectively, which slots can embrace the ends of the shafts 98 and 108 when the strut is collapsed as shown in FIG. 5, thus insuring a compact arrangement which permits complete collapse of the strut in a relatively confined area. It should furthermore be noted that the upper strut portion has channel shaped sides 126c and 126d which embrace and guide the lower portion 125 in its telescoping engagement therewith. Thus, a rigid flat strut is provided which cannot twist, bend, or otherwise become distorted, but instead the strut rigidly holds the shafts 98 and 108 in their proper relationship with one another.

The strut furthermore has interengaging portions between them which provide an up-stop for the seat assembly. More specifically, the upper strut portion 126 has a notch 127 formed therein which is engaged by a projection 128 in the lower strut portion when the strut is fully extended as shown in FIG. 6, thus preventing further extension of the strut, in other word, preventing further upward movement of the seat assembly.

Recapitulation

By means of the present invention, a conventional telescoping, spring loaded, resilient support means at the forward end of the vehicle seat has been eliminated and instead the entire load of the vehicle seat is carried by the pair of springs located intermediate the seat. The strut located between the supporting shafts of the springs hold the shafts and their springs in proper seat supporting engagement and prevents twisting or buckling of the spring assembly. The flat, telescoping strut also provides an up-stop for the seat assembly. The springs are easily mounted in fixed bearing cups fastened to the supporting shafts and the springs are thus removably, but firmly mounted for performing their resiliently supporting functions.

I claim:

1. A seat supporting assembly for use in a vehicle to resiliently support a seat, said seat supporting assembly comprising: at least a pair of spaced apart pivotable arms, including a forward arm and a rearward arm, each of said arms including an upper end pivotably connected to said seat and a lower end pivotably connectable to said vehicle for supporting said seat for generally vertical movement, and said rearward arm including a longitudinally extending slot therein; and a spring assembly for resiliently supporting said seat and including a lower end pivotably supportable by said vehicle intermediate said lower ends of said forward arm and said rearward arm, said assembly including an upper end shiftably supported by said longitudinal slot wherein said spring assembly is moveable between a substantially vertical position where said seat is resiliently supported by said spring assembly to a position wherein said spring assembly extends rearwardly and wherein said upper end of said spring assembly is received adjacent to said lower end of said rearward arm wherein the amount of resilient support of said seat by said spring assembly is reduced, said spring assembly including a pair of spaced apart parallel shafts, and a telescoping strut having a connection at each of its ends with said shafts, said connections between said strut and shaft shafts, and including a non-circular opening in said strut means and said shafts have a correspondingly shaped end portion inserted in said opening for preventing relative rotation between said shafts, and spring means mounted between said shafts for resiliently supporting said vehicle seat.

2. The assembly set forth in claim 1 further characterized in that said shafts have cup means rigidly fastened thereto, the cup means of said shafts opposing one another, said spring means being nested in said cup means and removably supported therein.

3. The assembly set forth in claim 1 further characterized in that said shafts have cup means rigidly fastened thereto, the cup means of said shafts opposing one another, said spring means being nested in said cup means and removably supported therein.

4. A seat supporting spring and telescoping strut assembly for use in a vehicle to resiliently support a seat, said assembly comprising: a lower end having means for being pivotably supportable by said vehicle and also having an upper end having means for being shiftably supported, said spring assembly also having a pair of spaced apart parallel shafts, and a telescoping strut having a connection at each of its ends with said shafts, said connections between said strut and said shafts, and including a non-circular opening in said strut means and said shafts have a correspondingly shaped end portion inserted in said opening for preventing relative rotation between said shafts, and spring means mounted between said shafts for resiliently supporting said vehicle seat.

5. The assembly set forth in claim 4 further characterized in that said shafts have cup means rigidly fastened thereto, the cup means of said shafts opposing one another, said spring means being nested in said cup means and removably supported therein.

* * * * *